US012792928B2

(12) United States Patent
Hirzel et al.

(10) Patent No.: US 12,792,928 B2
(45) Date of Patent: Nov. 10, 2026

(54) CONVERSATIONAL OPTIMIZATION OF COGNITIVE MODELS

(71) Applicant: International Business Machines Corporation, Armonk, NY (US)

(72) Inventors: Martin Hirzel, Ossining, NY (US); Harold L. Ossher, South Salem, NY (US); David J. Piorkowski, White Plains, NY (US); Peri Tarr, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1376 days.

(21) Appl. No.: 16/039,965

(22) Filed: Jul. 19, 2018

(65) Prior Publication Data

US 2020/0027007 A1 Jan. 23, 2020

(51) Int. Cl.

| | |
|---|---|
| ***G06N 5/02*** | (2023.01) |
| ***G06F 9/451*** | (2018.01) |
| ***G06F 9/54*** | (2006.01) |
| ***G06F 16/3329*** | (2025.01) |
| ***G06F 40/20*** | (2020.01) |
| ***G06N 5/022*** | (2023.01) |
| ***G10L 15/22*** | (2006.01) |

(52) U.S. Cl.

CPC ............. *G06N 5/022* (2013.01); *G06F 9/453* (2018.02); *G06F 9/54* (2013.01); *G06F 16/3329* (2019.01); *G06F 40/20* (2020.01); *G10L 15/22* (2013.01); *G10L 2015/225* (2013.01)

(58) Field of Classification Search

CPC ... G10L 15/01; G10L 15/22; G10L 2015/225; G06N 20/00; G06N 5/045; G06N 5/22; G06N 5/022; G06F 9/453; G06F 9/54; G06F 16/3329; G06F 40/20; G06F 40/30

See application file for complete search history.

(56) References Cited

U.S. PATENT DOCUMENTS

| | | | | |
|---|---|---|---|---|
| 7,219,054 | B1 * | 5/2007 | Begeja | G10L 15/22 704/E15.04 |
| 8,122,021 | B2 | 2/2012 | White et al. | |
| 8,682,241 | B2 | 3/2014 | Huerta | |
| 8,838,511 | B2 | 9/2014 | Kristal et al. | |
| 9,449,279 | B2 * | 9/2016 | Verkasalo | G06N 5/04 |

(Continued)

OTHER PUBLICATIONS

Ava: From Data to Insights Through Conversation, Rogers, Patti, Patel, 8th Biennial Conference on Innovative Data Systems Research (CIDR) (Year: 2017).*

Rogers, Ava From Data to Insights Through Conversation (Year: 2017).*

A Method and System a Smart Conversational System for Dynamic Response based on the User's Context and Queries Tailored with User Demographic Information, Anonymously, IP.com No. IPCOM000249562D, Mar. 3, 2017.

(Continued)

*Primary Examiner* — Stephen S Hong
*Assistant Examiner* — Carl E Barnes, Jr.
(74) *Attorney, Agent, or Firm* — Rakesh Roy, Esq.; Heslin Rothenberg Farley & Mesiti P.C.; George S. Blasiak, Esq.

(57) ABSTRACT

Systems and methods to generate cognitive models are described. A particular apparatus includes a memory having program code and a processor configured to access the memory and to execute the program code to process user input that includes a natural language dialogue-based command pertaining to a cognitive model, to automatically run analysis on the cognitive model and to present a user in natural language with a recommendation to modify the cognitive model.

18 Claims, 7 Drawing Sheets

(56) References Cited

U.S. PATENT DOCUMENTS

| | | | | |
|---|---|---|---|---|
| 9,535,902 | B1 * | 1/2017 | Michalak | G06F 16/3331 |
| 2002/0138492 | A1 * | 9/2002 | Kil | G06N 7/01 |
| 2003/0212544 | A1 * | 11/2003 | Acero | G06F 40/30 704/9 |
| 2007/0143099 | A1 * | 6/2007 | Balchandran | G10L 15/18 704/9 |
| 2012/0251992 | A1 | 10/2012 | Huerta | |
| 2014/0108013 | A1 | 4/2014 | Di Cristo et al. | |
| 2014/0122486 | A1 * | 5/2014 | Simard | G06N 20/00 707/737 |
| 2014/0365222 | A1 | 12/2014 | Weider et al. | |
| 2015/0356135 | A1 * | 12/2015 | Sanchez | G06N 5/022 707/763 |
| 2016/0048772 | A1 | 2/2016 | Bruno et al. | |
| 2016/0358098 | A1 * | 12/2016 | Duesterwald | G06N 20/00 |
| 2017/0300648 | A1 * | 10/2017 | Charlap | G16H 50/30 |
| 2018/0075368 | A1 * | 3/2018 | Brennan | G06N 5/022 |
| 2018/0268258 | A1 * | 9/2018 | Tapia | G06F 15/76 |
| 2019/0042908 | A1 * | 2/2019 | Garcia | G06N 3/006 |
| 2019/0043493 | A1 * | 2/2019 | Mohajer | G10L 17/00 |
| 2019/0213244 | A1 * | 7/2019 | Hirzel | G06F 40/35 |

OTHER PUBLICATIONS

Cognitive Method for Predicting Emerging Application Requirements, Anonymoulsy, IP.com No. IPCOM000245334D, Mar. 1, 2016.

Walker, et al. Creating Cognitive Tutoers for Collaborative Learning: Steps Toward Realization, 2006.

IBM, "List of IBM Patents or Patent Applications Treated As Related," for U.S. Appl. No. 16/039,965, titled "Conversational Optimization of Cognitive Models," as filed on Jul. 19, 2018.

"Chinese Mobile App UI Trends," Dan Grover, Dated: Dec. 1, 2014, pp. 1-19.

Alistair Croll, "On Chat as Interface," Medium, Dated: Feb. 26, 2016, pp. 1-10 https://medium.com/@acroll/on-chat-as-interface-92a68d2bf854#.4xba6aeyt.

"Chat bots, conversation and AI as an Interface," Benedict Evans, Date: Mar. 31, 2016, pp. 1-6 http://ben-evans.com/benedictevans/2016/3/30/chat-bots-conversation-and-ai-as-an-interface.

"Ava: From Data to Insights Through Conversation", John/Potti/Patel CIDR 2017.

* cited by examiner

CONVERSATIONAL OPTIMIZATION OF COGNITIVE MODELS

I. FIELD OF THE DISCLOSURE

The present disclosure relates generally to computing technologies, and more particularly, to computer technologies that employ artificial intelligence.

II. BACKGROUND

Cognitive modeling is an area of computer science that deals with simulating human problem solving and mental task processes in a computerized model, such as an artificial intelligence (AI) application. Cognitive models often benefit from fine tuning by software developers and cognitive technology experts in order to optimize results. Not all users who might benefit from such cognitive models, however, possess such education, experience, and knowledge. As a result, the benefits of cognitive models are not readily available in certain applications.

III. BRIEF SUMMARY

In a particular embodiment, an apparatus is disclosed that includes a memory including program code and a processor configured to access the memory and to execute the program code to process user input comprising a natural language dialogue-based command pertaining to a cognitive model, to automatically run analysis on the cognitive model and to present a user in natural language with a recommendation to modify the cognitive model.

In another embodiment, a method of generating a cognitive model includes processing user input comprising a natural language dialogue command pertaining to a cognitive model, running analysis on the cognitive model, and presenting a user in the natural language dialogue with a recommendation to modify the cognitive model.

In another embodiment, a program product for accessing a register may include a computer readable storage medium having computer readable program code being executable by a processor to process user input comprising a natural language dialogue-based command pertaining to a cognitive model, to automatically run analysis on the cognitive model and to present a user in natural language with a recommendation to modify the cognitive model.

Features that characterize embodiments are set forth in the claims annexed hereto and forming a further part hereof. However, for a better understanding of the embodiments, and of the advantages and objectives attained through its use, reference should be made to the Drawings and to the accompanying descriptive matter in which there are described exemplary embodiments.

IV. BRIEF DESCRIPTION OF THE DRAWINGS

V. DETAILED DESCRIPTION

An embodiment of the system uses natural-language conversation to guide a non-expert to improve and optimize a cognitive model. As explained herein, cognitive modeling is an area of computer science that deals with simulating human problem-solving and mental processing in a computerized model. Models described in terms of embodiments of the system may be used to simulate or predict human behavior, as well as performance on tasks similar to the ones modeled and improve human-computer interaction. The system may automatically run experiments that create, test, and evaluate models using specified datasets and parameters for cognitive models. The system may generally allow non-expert users to interact via natural-language conversation, as if they had a human data scientist assisting them. The system may automatically perform diagnostics and recommend fixes.

A single scenario may include multiple such diagnostics and fixes. For example, a diagnostic may pertain to and identify labels that may be confused. Data labels may be produced from the curation of data, where raw data is cleaned up and organized for machines to ingest. A label may be considered confused where it unintentionally and undesirably includes or excludes certain data. The system may determine and report how much the confused labels contribute to an overall inaccuracy. An embodiment of the system further suggests a fix, or correction. For instance, the system may suggest and prompt a user to combine labels to improve accuracy.

An embodiment enables non-experts who lack deep knowledge in cognitive technologies or software development to help optimize and train a computer model. A user lacking an underlying understanding of the characteristics of a model may nonetheless train the model with the assistance of the system.

According to a particular embodiment, the system includes a natural language understanding (NLU) module to enable users to interact via natural language (e.g., spoken or typed). For instance, a user may submit questions and responses to a computing system via the NLU in colloquial language with common expressions. As such, a user does not have to learn an artificial language. The system may accept utterances that would not be processed in a system limited to controlled natural language (CNL) input.

An embodiment may include a web service with a graphical user interface (GUI), in addition or without a conversational interface. The conversational interface may incorporate aspects of the conversational translations, as described herein. In a sense, the system may function to assist a user by providing the knowledge and skills of both software developer and a human data scientist to help the user communicate and understand, despite not being both.

Figure 1:
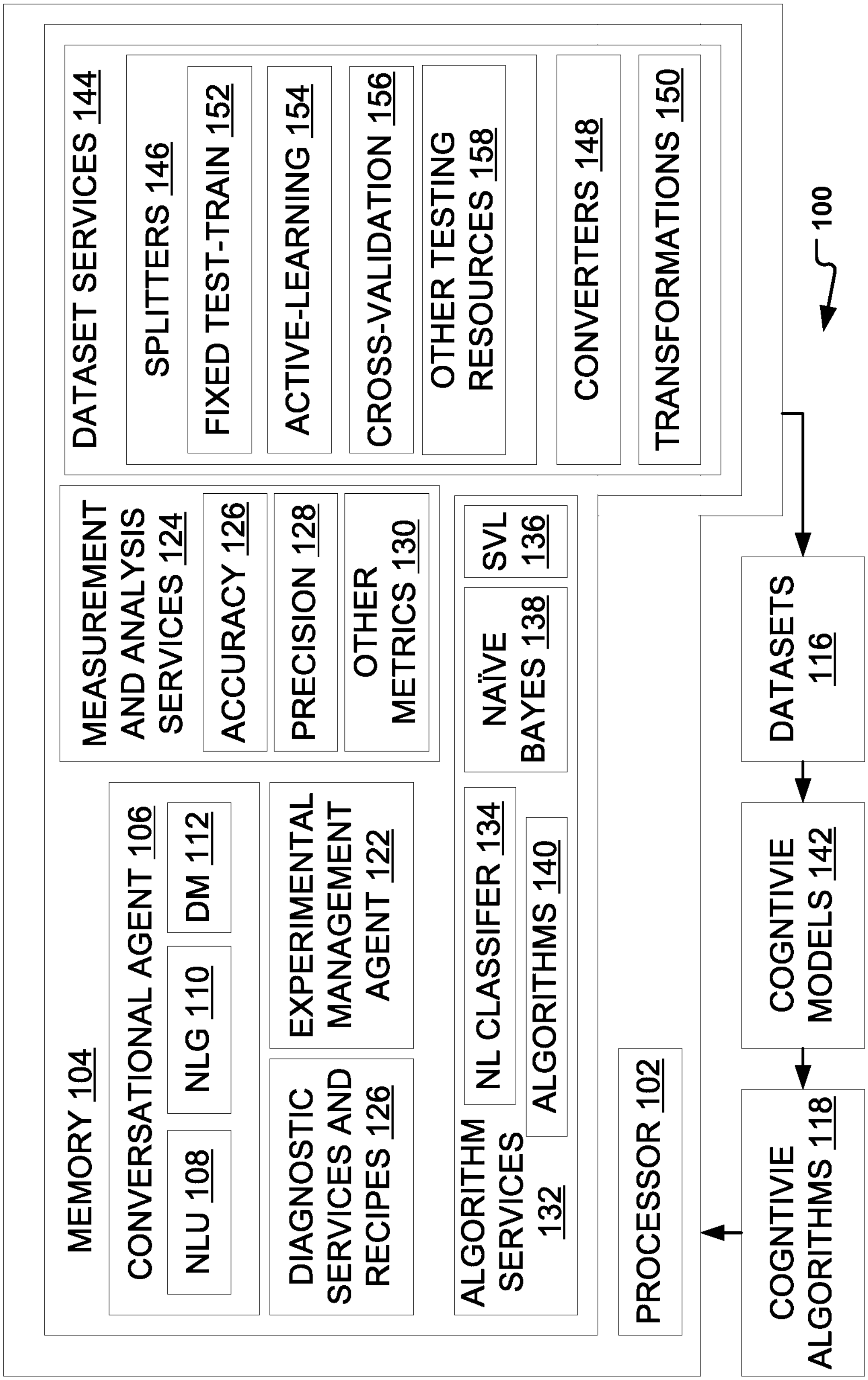
FIG. 1 shows a block diagram of a computing system in accordance with an embodiment.

Turning more particularly to the drawings, FIG. 1 shows a block diagram of a computing system 100, or apparatus, having a processor 102 and a memory 104. In one scenario, the processor 102 may access program code comprising a conversational agent 106. The conversational agent 106 may include natural language understanding (NLU) and natural language generation (NLG) components 108, 110. A dialogue manager (DM) component 112 may be responsible for the state and flow of a conversation between the computing system 100 and a user 114. The NLG component 108 may translate between natural language commands and machine representation system language. Input from the user 114 to the DM component 112 may be a spoken word, converted to some system-specific semantic representation by the NLU component 108. The output of the DM component 112 may be a list of instructions in a semantic representation. This semantic representation may be converted to human language by the NLG component 110.

In another implementation, the processor 102 may access program code comprising an experiment management agent 122. The experiment management agent 122 may conduct and manage an experiment by communicating with a measurement and analysis services module 124 via a diagnostic services and recipes module 126. The measurement and analysis services module 124 may measure and analyze accuracy 126 and precision 128, among other metrics 130 that may be selectively applied to a model 142 of an experiment.

The experiment management agent 122 may additionally manage an algorithm services module 132. The algorithm services module 132 may access a natural language classifier (e.g., deep learning/neural net) algorithm 134, support vector machine (SVM) algorithm 136, and a naive Bayes algorithm 138, among other algorithms 140 that may be used when building the model 142.

The experiment management agent 122 may also manage a dataset services module 144. The dataset services module 144 may have access to a splitters module 146, a converters module 148, and a transformations module 150. The converters module 148 may convert data into a desired format, and the transformations module 150 may transform data to store in a proper format or structure for the purposes of querying and analysis. The splitters module 146 may split a single data file into smaller data files. For instance, the splitters module 146 may produce a fixed test-train split 152, an active-learning split 154, and a cross-validation split 156, among other dataset testing resources 158 that may be used in connection with the model 142.

The conversational agent 106 and the experiment management agent 122 may communicate in a feedback cycle with datasets 116, cognitive algorithms 118, and one or more cognitive models 120. That is, the system 100 may retrieve the data set 116, algorithm 118, and model 142, and report back to the user in a conversational manner. The system 100 may further provide options to fix or improve results by automatically reevaluating and performing additional experiments.

For instance, the system 100 may suggest or retrieve other algorithms 118 likely to produce useful results. For example, the system 100 may use statistical techniques to "learn" with the data set 116 and other past experiments, without being explicitly programmed (e.g., machine self-learning). The learned techniques and use of empirical data may cause the system 100 to consider or try other algorithms 118 that are statically likely to have promising results. For instance, the system 100 in one scenario may draw from a database of past experiments having similar parameters, and where another algorithm 118 produced effective results.

After determining the potential improvement, the system 100 may prompt the user, "There is another algorithm that could produce an improved result. Would you like to hear about or try it out?"

Embodiments of the system 100 are not limited to any particular dialogue. In one example, a fine tuning of a cognitive model may include the following illustrative exchange between a human user and a computing system:

Computer: "Welcome to the model optimization dialog. Please select the data set."

User: "I'd like to use the weather data set."

Computer: "Okay, weather. Which algorithm?"

User: "Let's try support vector machines for starters."

Computer: "Okay, SVM. Which testing strategy?"

User: "What are my options?"

Computer: "The test strategies are fixed test-train split, active learning, or leave-one-out cross-validation."

User: "Fixed test-train split."

Computer: "Okay, fixed test-train split. What metrics?"

User: "Please report accuracy."

Computer: "Any other metrics?"

User: "Nope."

Computer: "Okay, I'm starting that experiment for you."

After the computing system runs the experiment:

Computer: "The experiment finished and the accuracy was 47.2%."

User: "Can you help me diagnose that please?"

Computer: "Sure. It looks like the labels "temperature" and "conditions" were confused, accounting for 17.1% of the missing accuracy."

User: "What could I do to fix this?"

Computer: "If the distinction between "temperature" and "conditions" is not important for your application, you could combine the labels. Alternatively, you could improve the text in confusing instances in the data to distinguish better between "temperature" and "conditions." I can point you to instances to work on."

User: "Let's try to combine the labels."

Computer: "Okay, created data set "weather2."

User: "Rerun the last experiment with the new data set."

Computer: "Okay, I'm starting that experiment for you."

In this manner, the user and computer may continue to optimize results using a conversational dialogue and learned statistical techniques accessed by the computer. In some implementations, the computer may anticipate questions the user may have. For example, the computer may anticipate that the user will want to know the accuracy of an experiment, and will make suggestions without having to ask. In another scenario, the computer may suggest, without being prompted by the user, trying a different dataset based on a determination that the new dataset may expose or confirm a potential inefficiency.

Figure 2:
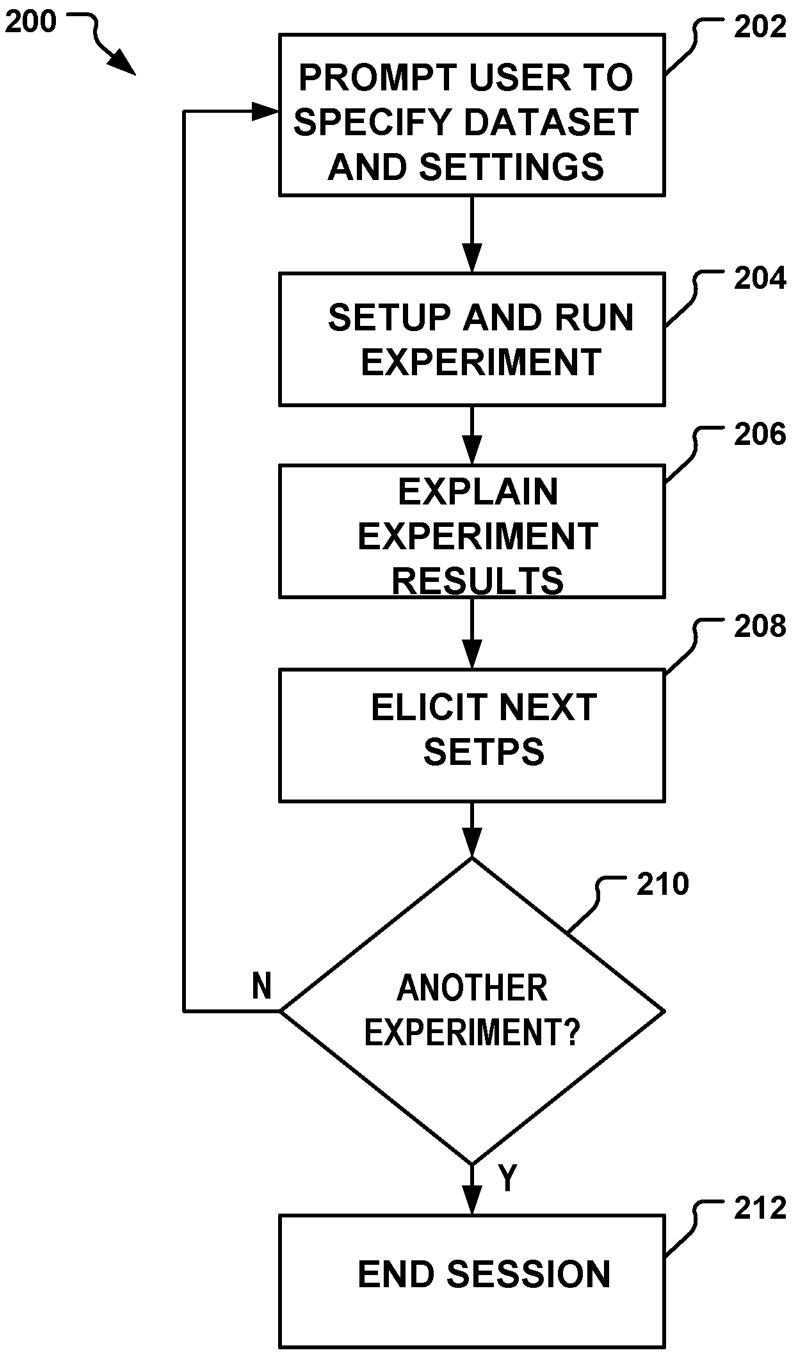
FIG. 2 is a flowchart that illustrates an embodiment of a method of generating and fine-tuning a cognitive model.

FIG. 2 is a flowchart that illustrates an embodiment of a method 200 of generating and fine-tuning a cognitive model. The method 200 may be performed by the computing system 100 of FIG. 1 in one implementation. The method 200 may include initiating at 202 a conversation to prompt a user to specify a dataset and settings, such as model hyper-parameters. For example, the system 100 of FIG. 1 may use a speaker or a display screen to ask the user if they would like to select a dataset 116 and an algorithm 118. When prompted, the system 100 may provide suggestions of either the algorithm 118 or data set 116. Where desired, the system 100 may present options of each, as well as descriptions to facilitate the selection by the user. The system may base additional questions on the provided answers. For instance, the system 100 may prompt the user to select a testing strategy and metric to the user as a result of the initial selections of the user. For instance, the system may select a metric or strategy based on a selected dataset.

In a particular scenario, the system 100 may prompt the user to try other metrics that may complement the results initially requested by the user. For example, the system may display data identifying instances of word confusion or precision, in addition to an overall efficiency of the model (e.g., as initially requested by the user). The system may select the instances of word confusion and precision based on learned behavior with other models and users.

In response to the user communicating (e.g., conversationally) the inputs, the system may retrieve the data and settings to prepare and run an experiment and create a model at 204. In the example of the system 100 of FIG. 1, the processor 102 may access a dataset 116, a cognitive model 142, and an algorithm 118, along with measurement and analysis services 124. The system 100 may use these and other settings to run the model and analyze the results.

The system at 206 may explain the results of the experiment to the user in a conversational manner. That is, rather than presenting results in a relatively complex programming language or in a spreadsheet, the system may speak or display the requested result in a focused and colloquial manner. For instance, the system 100 of FIG. 1 may present audio stating, "The accuracy of this model was 67%, which is an improvement from the last experiment."

The system may further elicit follow-on steps 208 from the user. In this manner, an embodiment of the system allows a user to ask and run an experiment, again, with different parameters, until the user is satisfied with accuracy or other requested metric. For instance, the system 100 of FIG. 1 may prompt the user to consider running another model with a different algorithm 118. In another example, the system 100 may suggest another metric 130, or both. The cycle may repeat back at 202 if the user desires another experiment at 210, or alternatively end at 212.

Figure 3:
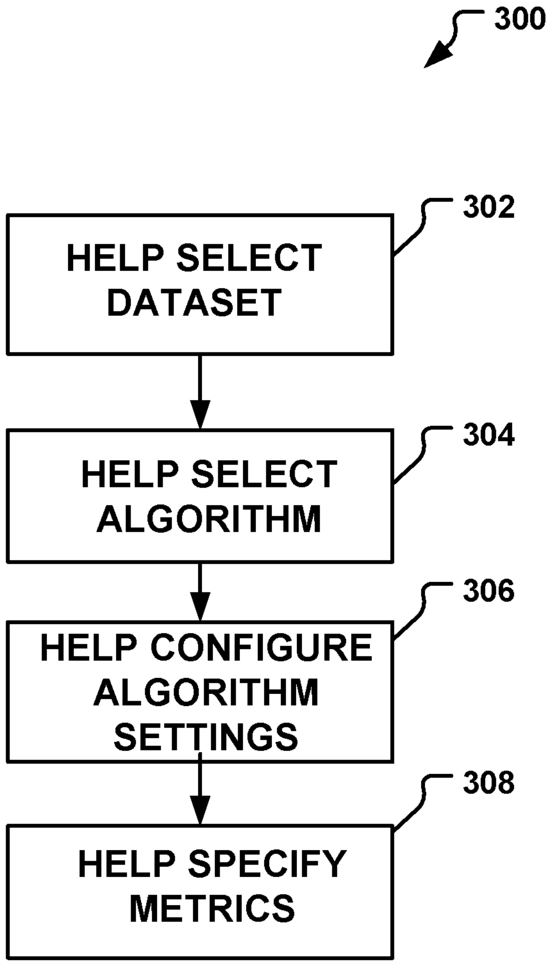
FIG. 3 is a flowchart that illustrates an embodiment of a method of prompting and guiding a user to select data and settings to be used to create and improve a model.

FIG. 3 is a flowchart that illustrates an embodiment of a method 300 of prompting and guiding a user to select data and settings to be used to create and improve a model. The method 300 may be performed by the embodiment of the system 100 shown in FIG. 1. At 302, the system may ask the user in a conversational manner if they would select a dataset. The system may offer choices of datasets to the user. For example, the system 100 of FIG. 1 may present a user with a list of potential datasets 116 available for use in a cognitive modeling operation. The user may speak or type their selection back to the system in a conversational manner (e.g., without having to use programming languages or other skills).

Similarly, the system may prompt the user to select an appropriate cognitive algorithm at 304, and to configure settings of the cognitive algorithm at 306. According to an embodiment, the system may assist the user in picking an algorithm. For instance, the system may suggest an algorithm based on a characteristic of the dataset. If a dataset has binary labels, for instance, the system may pick a binary classification algorithm. In another example, if a dataset has continuous, as opposed to categorical labels, the system may choose a regression algorithm, and not a classification algorithm.

Likewise, the system may further ask the user to specify metrics at 308. In an example, metrics may be selected from fixed a list. For instance, the system 100 of FIG. 1 may ask a user if they would prefer to see statistics regarding the accuracy 126 of the model 142, or the precision 128 of the model 142.

Figure 4:
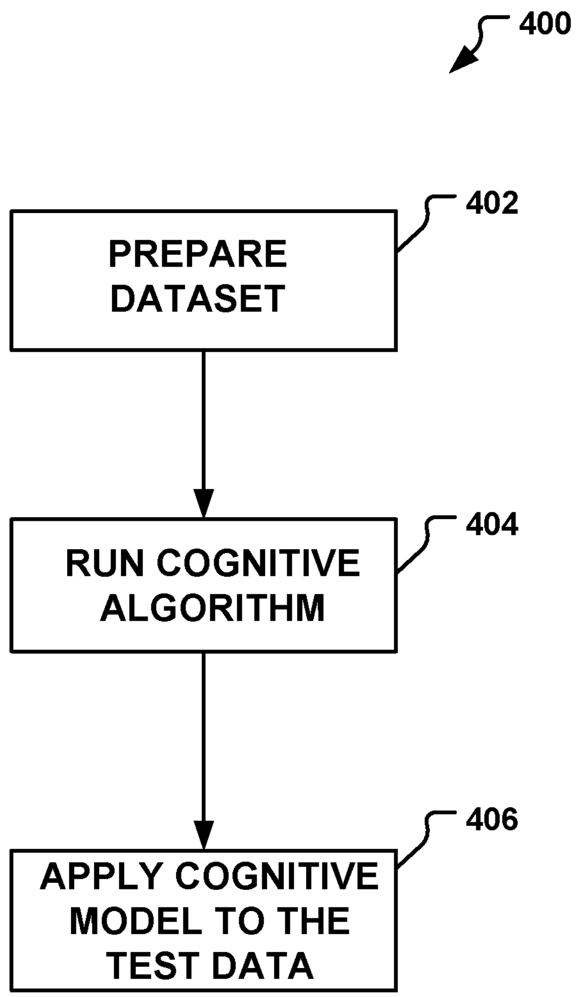
FIG. 4 is a flowchart that illustrates an embodiment of a method of preparing and running an experiment to create a model.

FIG. 4 is a flowchart that illustrates an embodiment of a method 400 of preparing and running an experiment to create a model. The method 400 may be performed by the embodiment of the system 100 shown in FIG. 1. At 402, the system may prepare a dataset. For instance, the system 100 of FIG. 1 may split a dataset 116 into a train set of data, versus a test set of data.

The system may execute the cognitive algorithm at 404. Continuing with the above example, the cognitive model may have been configured by the settings on the training data to get a cognitive model. In this manner, the system 100 of FIG. 1 may execute a selected algorithm 118 as configured by user, and where desired, system selected settings.

The system may apply the cognitive model to the test data at 406. In terms of FIG. 1, the system 100 may apply the constructed cognitive model 142 to the selected test data. The system may then measure the metrics requested by the user. As discussed herein, the metrics may be communicated to the user in conversational language (as opposed to programmatic language). Further, the system may suggest other scenarios that may improve results or comprise other useful metrics.

Figure 5:
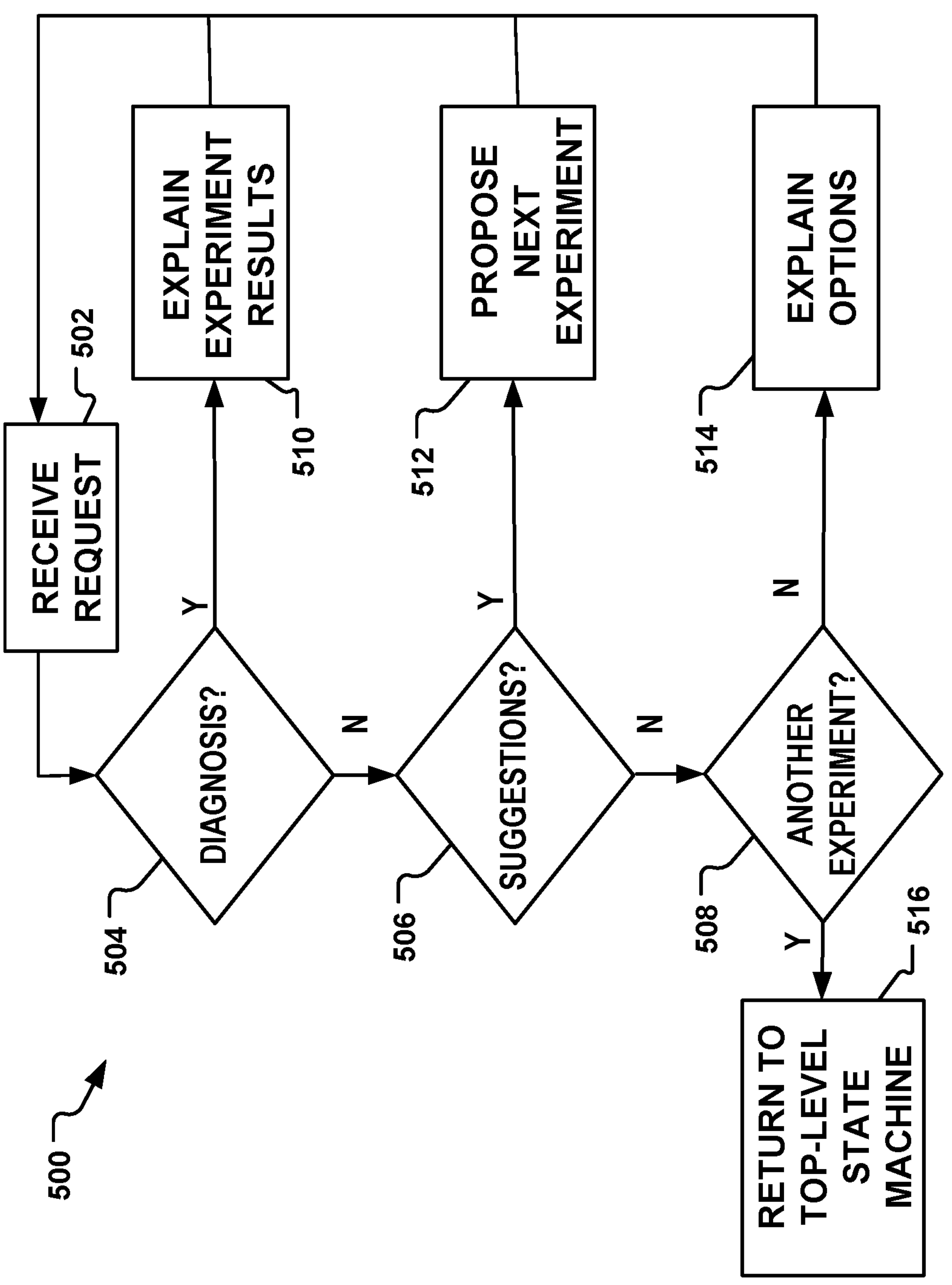
FIG. 5 is a flowchart that illustrates an embodiment of a method using a natural language to explain the results of the experiment results to the user and to elicit next steps.

FIG. 5 is a flowchart that illustrates an embodiment of a method 500 using a natural language to explain the results of the experiment to the user and to elicit next steps. Natural language (e.g., conversational language) may include a language that has developed naturally in use. Such colloquial language is in contrast to an artificial language or computer code). Such natural language may include, for instance, contractions, colloquialisms, and other speech mannerisms.

At 502, the system may allow a user to make a request. For example, the user may request a diagnosis at 504, a suggestion at 506, another experiment, or exit at 508. As explained herein, the request may be made using conversant, natural language speech. For instance, a user may speak the command, "I would like to see a diagnosis of the last model." When the user requests a diagnosis at 504, the system may explain at 510 the result of the previous experiment. For example, the system 100 of FIG. 1 may display or audibly communicate a speed with which the cognitive model was completed, or the precision with which it was executed.

Where the user is prompted to or otherwise asks for a suggestion at 506 (e.g., relating to the diagnosis), the system may propose at 512 a suitable next experiment to run. For example, the system 100 of FIG. 1 may suggest using another algorithm 140 based on a reported metric and the type of data used. In one scenario, the system 100 may suggest a natural language classifier (e.g., deep learning/neural net) algorithm 134, or SVM algorithm 136, rather than a naïve Bayes algorithm 138 used in the prior experiment. In another or the same embodiment, the system 100 may suggest viewing an additional metric 130.

When the user requests at 508 another (perhaps recommended) experiment or an exit, the system may at 514 explain options to the user or return to a top level machine state at 516.

Figure 6:
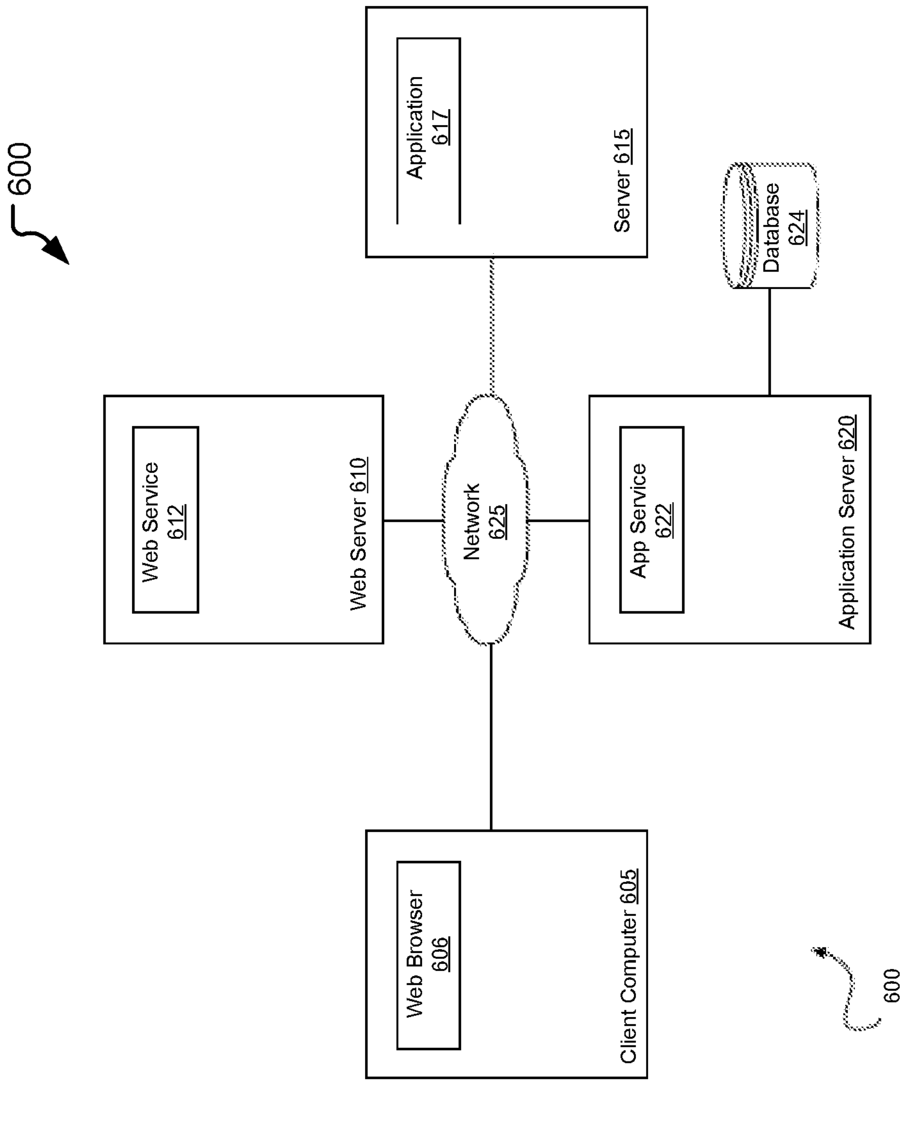
FIG. 6 illustrates another example computing system according to one embodiment, such as may be realized using a networked environment.

FIG. 6 illustrates another example computing system according to one embodiment, such as may be realized using a networked environment. As shown, the computing environment 600 includes a client computer 605, a web server 610, a server 615, and an application server 620. The client computer 605 may be a physical system (e.g., a desktop, laptop computer, mobile device, etc.) or a virtual computing instance executing in the cloud. The client computer 605 includes a web browser 607. A user may access data services through the web browser 607 over a network 625 (e.g., the Internet).

For instance, a user may access a web service 612 executing on a web server 610.

In one embodiment, the web service 612 provides a web interface for an application server 620 (e.g., executing an application service 622). More specifically, the application service 622 provides a database 624. The database 624 may include data presented to users on the web browser 607.

Figure 7:
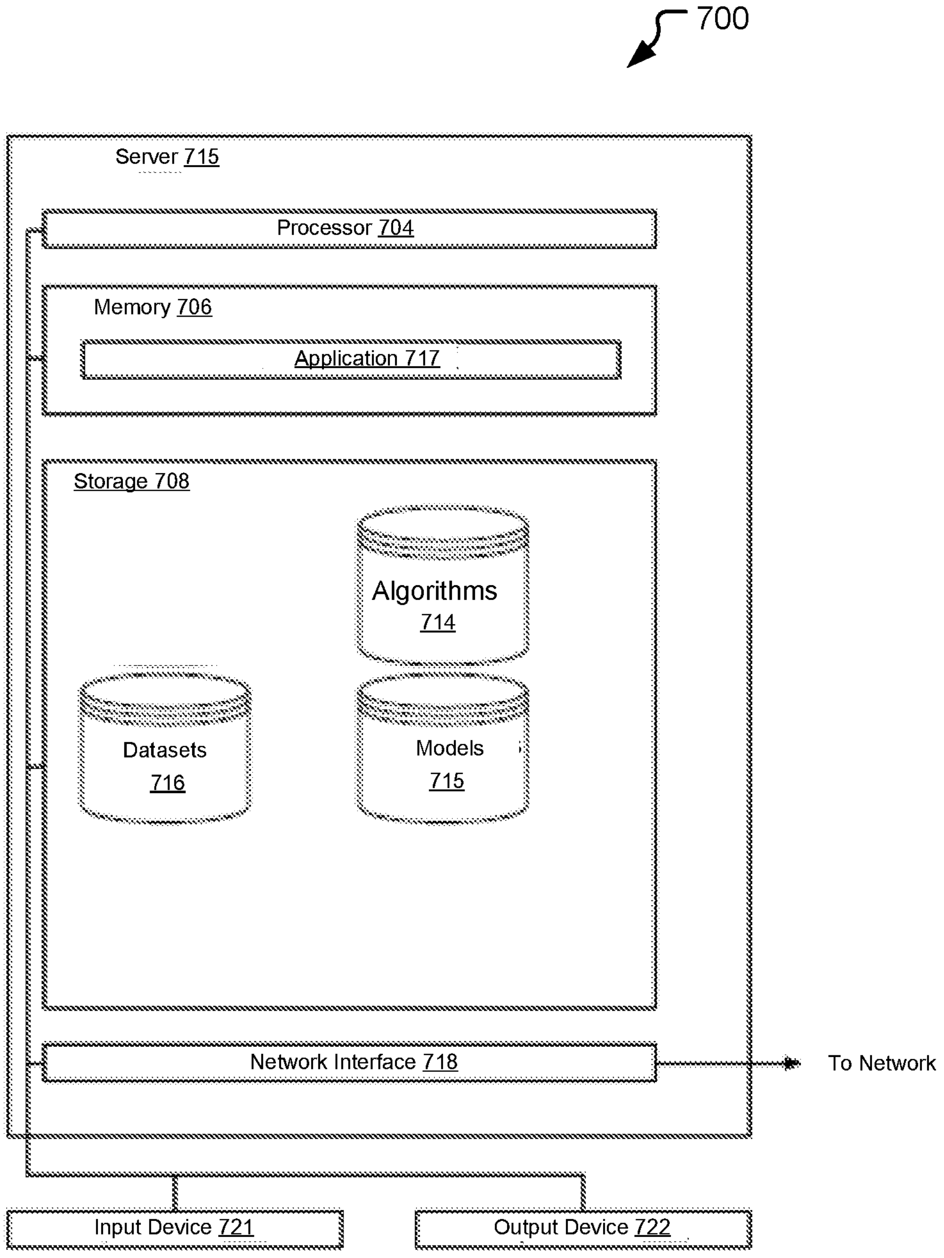
FIG. 7 further illustrates a server, such as the server of FIG. 6, according to one embodiment.

FIG. 7 further illustrates a server 715, such as the server 615 of FIG. 6, according to one embodiment. The server 715 generally includes a processor 704 connected via a bus to a memory 706, a network interface device 718, a storage 708, an input device 721, and an output device 724. The server 715 is generally under the control of an operating system. Examples of operating systems include the UNIX operating system, versions of the Microsoft Windows operating system, and distributions of the Linux operating system (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both). More generally, any operating system supporting the functions disclosed herein may be used. The processor 704 is included to be representative of a single CPU, multiple CPUs, a single CPU having multiple processing cores, and the like. Similarly, the memory 706 may be a random access memory. While the memory 706 is shown as a single identity, it should be understood that the memory 706 may comprise a plurality of modules, and that the memory 706 may exist at multiple levels, from high speed registers and caches to lower speed but larger DRAM chips. The network interface device 718 may be any type of network communications device allowing the navigation server 710 to communicate with other computers via the network 725.

The storage 708 may be a persistent storage device. Although the storage 708 is shown as a single unit, the storage 708 may be a combination of fixed and/or removable storage devices, such as fixed disc drives, solid state drives, removable memory cards, optical storage and network storage systems.

As shown, the memory 706 contains the application 717, which may be an application generally executed to take actions described herein. Storage 708 contains the algorithms 714, models 715, and datasets 716.

The input device 721 may provide a keyboard and/or a mouse, etc. The output device 724 may be any conventional display screen. Although shown separately from the input device 721, the output device 724 and input device 721 may be combined. For example, a display screen with an integrated touch-screen may be used.

The system may introduce variations with alternatives for various words and concepts. Concept lists may be populated by the system to increase accuracy. The system may allow for the automatic expansion of the semantic space during graph creation. Elements may be automatically matched based on their semantic meaning during the graph query. The system may further adapt a word representation to the domain if needed by retraining the word representations. The system may use vocabulary automatically harvested from domain specific documents for clustering. The system may use the labels of these clusters as a way to automatically discover entity types for variation generation in the dialog system. The system may accomplish automatic creation and query matching, including the expansion and matching of triplets.

The system may automatically select cluster radii to focus results. An embodiment of the system may add a kernel that dissipates polynomially (e.g., one that is scaled with a small coefficient). The kernel may resolve instabilities in convergence of the algorithm. Regarding scaling of the kernel, the system may automatically increase or decrease the scaling factor based on how close to the highest possible mutual information that data is when the algorithm converges.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

The invention claimed is:

1. An apparatus comprising:

a memory including program code; and a processor configured to access the memory and to execute the program code to:

provide a list of datasets including a first dataset;

process a first natural language user instruction from the user specifying the first dataset;

divide the first dataset into a training set and a test set;

present a first natural language statement to the user, suggesting a first cognitive algorithm for the user by processing a dataset comprising historical experiments, wherein the historical experiments are selected based on similarity in label characteristics to the first dataset;

process a second natural language user instruction from the user specifying the first cognitive algorithm and a user-suggested metric;

present a second natural language statement to the user recommending one or more additional metrics based on the first dataset and prior learned behavior;

select one or more metrics and a testing strategy based on the first dataset, wherein the one or more metrics comprise the user-suggested metric and at least one additional metric recommended by a processor;

generate a cognitive model by applying the first cognitive algorithm to the training set of the first dataset;

test the cognitive model against the test set of the first dataset based on the testing strategy;

present a third natural language statement to the user indicating a result of testing the cognitive model, wherein the third natural language statement comprises the selected one or more metrics indicating an accuracy of the cognitive model and a missing accuracy of the cognitive model;

determine, without receiving a third natural language user instruction, one or more actions addressing a confused-label condition in the first dataset or the first cognitive algorithm, comprising combining two or more labels or refining text within a label, wherein the one or more actions are determined based on the amount by which the confused-label condition contributes to the missing accuracy of the cognitive model;

present a fourth natural language statement to the user recommending the one or more actions; and based on a fourth natural language user instruction from the user specifying a change based on the one or more recommended actions, make the change to at least one of the cognitive model or the first dataset.

2. The apparatus of claim 1, wherein the processor is further configured to translate the first, second, third and fourth natural language user instructions into a machine representation system language.

3. The apparatus of claim 1, wherein the processor is further configured to store the cognitive model in the memory.

4. The apparatus of claim 1, wherein the program code includes an application programming interface and a user interface.

5. The apparatus of claim 1, wherein the first natural language statement to the user comprises a recommended dataset.

6. The apparatus of claim 1, wherein the fourth natural language user instruction designates a recommended metric.

7. The apparatus of claim 1, wherein the processor is further configured to execute the program code to run a plurality of experiments to generate a plurality of cognitive models.

8. The apparatus of claim 1, wherein the processor is further configured to retrieve data known to be accurate to use in the cognitive model.

9. The apparatus of claim 1, wherein the processor is further configured to create data known to be accurate to use in the cognitive model.

10. The apparatus of claim 1, wherein the processor is further configured to translate the first, second, third and fourth natural language user instructions into a machine representation system language.

11. The apparatus of claim 1, wherein, to suggest the first cognitive algorithm for the user based on characteristics of the first dataset, the processor is configured to execute the program code to suggest a classification algorithm in response to determining that the first dataset has binary labels.

12. The apparatus of claim 1, wherein, to suggest the first cognitive algorithm for the user based on characteristics of the first dataset, the processor is configured to execute the program code to suggest a regression algorithm in response to determining that the first dataset has continuous labels.

13. A method of generating a cognitive model, the method comprising:

providing, by a computing system, a list of datasets including a first dataset;

processing a first natural language user instruction from the user specifying the first dataset;

dividing the first dataset into a training set and a test set;

presenting a first natural language statement to the user, suggesting a first cognitive algorithm for the user by processing a dataset comprising historical experiments, wherein the historical experiments are selected based on similarity in label characteristics to the first dataset;

processing a second natural language user instruction from the user specifying the first cognitive algorithm and a user-suggested metric;

presenting a second natural language statement to the user recommending one or more additional metrics based on the first dataset and prior learned behavior;

selecting one or more metrics and a testing strategy based on the first dataset, wherein the one or more metrics comprise the user-suggested metric and at least one additional metric recommended by a processor;

generating a cognitive model by applying the first cognitive algorithm to the training set of the first dataset;

testing the cognitive model against the test set of the first dataset based on the testing strategy;

presenting a third natural language statement to the user indicating a result of testing the cognitive model, wherein the third natural language statement comprises the selected one or more metrics indicating an accuracy of the cognitive model;

determining, by the computing system based on the result of testing the cognitive model, that the accuracy of the cognitive model satisfies an accuracy-improvement condition;

selecting, by the computing system in response to the accuracy-improvement condition, one or more additional historical experiments from the dataset comprising historical experiments based on similarity between label characteristics of the first dataset and label characteristics of datasets used in the one or more additional historical experiments;

identifying, by the computing system from the selected one or more additional historical experiments, a second cognitive algorithm, an additional metric, or an additional testing strategy associated with an improved result relative to the first cognitive algorithm, the user-suggested metric, or the testing strategy;

determining, without receiving a third natural language user instruction, one or more actions addressing the accuracy-improvement condition, wherein the one or more actions comprise applying the second cognitive algorithm, applying the additional metric, or applying the additional testing strategy identified from the selected one or more additional historical experiments;

presenting a fourth natural language statement to the user recommending the one or more actions; and based on a fourth natural language user instruction from the user specifying a change based on the one or more recommended actions, making the change to the cognitive model.

14. The method of claim 13, wherein the fourth natural language statement reports a metric to the user.

15. The method of claim 13, further comprising storing, by the computing system, the cognitive model in a memory.

16. The method of claim 15, wherein suggesting the first cognitive algorithm for the user based on characteristics of the first dataset comprises suggesting a classification algorithm in response to determining that the first dataset has binary labels.

17. The method of claim 13, wherein suggesting the first cognitive algorithm for the user based on characteristics of the first dataset comprises suggesting a regression algorithm in response to determining that the first dataset has continuous labels.

18. A method of generating a cognitive model, the method comprising:

providing, by a computing system, a list of datasets including a first dataset;

processing, by the computing system, a first natural language user instruction specifying the first dataset;

dividing, by the computing system, the first dataset into a training set and a test set;

selecting, by the computing system, one or more first historical experiments from a dataset comprising historical experiments based on similarity between label characteristics of the first dataset and label characteristics of datasets used in the one or more first historical experiments;

identifying, by the computing system from the selected one or more first historical experiments, a first cognitive algorithm associated with an improved result for at least one of the selected one or more first historical experiments;

presenting, by the computing system, a first natural language statement to a user suggesting the first cognitive algorithm;

processing, by the computing system, a second natural language user instruction specifying the first cognitive algorithm and a user-suggested metric;

selecting, by the computing system, one or more metrics and a testing strategy based on the first dataset, wherein the one or more metrics comprise the user-suggested metric and at least one additional metric selected based on prior learned behavior;

generating, by the computing system, the cognitive model by applying the first cognitive algorithm to the training set of the first dataset;

testing, by the computing system, the cognitive model against the test set of the first dataset based on the testing strategy;

determining, by the computing system based on the testing, an accuracy of the cognitive model and a missing accuracy of the cognitive model;

identifying, by the computing system based on the testing, a confused-label condition in which two or more labels of the first dataset are confused by the cognitive model;

determining, by the computing system, an amount by which the confused-label condition contributes to the missing accuracy of the cognitive model;

determining, by the computing system without receiving an additional natural language user instruction, a first corrective action addressing the confused-label condition based on the amount by which the confused-label condition contributes to the missing accuracy of the cognitive model, wherein the first corrective action comprises combining the two or more labels or refining text within at least one of the two or more labels;

selecting, by the computing system, one or more second historical experiments from the dataset comprising historical experiments based on similarity between label characteristics of the first dataset and label characteristics of datasets used in the one or more second historical experiments;

identifying, by the computing system from the selected one or more second historical experiments, a second cognitive algorithm, an additional metric, or an additional testing strategy associated with an improved result relative to the first cognitive algorithm, the user-suggested metric, or the testing strategy;

determining, by the computing system without receiving the additional natural language user instruction, a second corrective action comprising applying the second cognitive algorithm, applying the additional metric, or applying the additional testing strategy;

presenting, by the computing system, a second natural language statement indicating the accuracy of the cognitive model, the missing accuracy of the cognitive model, the confused-label condition, and the amount by which the confused-label condition contributes to the missing accuracy of the cognitive model;

presenting, by the computing system, a third natural language statement recommending at least one of the first corrective action or the second corrective action; and based on a third natural language user instruction specifying a change responsive to the third natural language statement, making, by the computing system, the change to at least one of the cognitive model or the first dataset.

* * * * *